United States Patent
Evans et al.

(10) Patent No.: US 11,390,198 B2
(45) Date of Patent: Jul. 19, 2022

(54) ENERGY ATTENUATING VEHICLE SEAT ASSEMBLY

(71) Applicant: PRATT & MILLER ENGINEERING AND FABRICATION, INC., New Hudson, MI (US)

(72) Inventors: Celyn M. Evans, Milford, MI (US); Kevin R. Kwiatkowski, Ann Arbor, MI (US)

(73) Assignee: PRATT & MILLER ENGINEERING AND FABRICATION, LLC, New Hudson, MI (US)

( * ) Notice: Subject to any disclaimer, the term of this patent is extended or adjusted under 35 U.S.C. 154(b) by 0 days.

(21) Appl. No.: 17/243,013

(22) Filed: Apr. 28, 2021

(65) Prior Publication Data

US 2021/0261024 A1 Aug. 26, 2021

Related U.S. Application Data

(62) Division of application No. 16/251,518, filed on Jan. 18, 2019, now Pat. No. 11,007,912.

(51) Int. Cl.
*B60N 2/42* (2006.01)
*B60N 2/427* (2006.01)

(52) U.S. Cl.
CPC ....... *B60N 2/42745* (2013.01); *B60N 2/4214* (2013.01); *B60N 2/42772* (2013.01)

(58) Field of Classification Search
CPC .............. B60N 2/42745; B60N 2/4214; B60N 2/42772

USPC ..................................................... 297/216.13
See application file for complete search history.

(56) References Cited

U.S. PATENT DOCUMENTS

| | | | |
|---|---|---|---|
| 2,425,632 A | 8/1947 | Morey et al. | |
| 2,772,065 A | 11/1956 | Thomas | |
| 2,869,685 A | 1/1959 | Funkhouser et al. | |
| 3,127,958 A | 4/1964 | Szostak | |
| 3,184,011 A | 5/1965 | Pollock | |
| 3,236,512 A | 2/1966 | Kirsch et al. | |
| 3,459,395 A | 8/1969 | Scotto | |
| 4,509,621 A | 4/1985 | Desjardins et al. | |
| 4,887,864 A * | 12/1989 | Ashton | B60N 2/23 297/375 |
| 5,273,240 A | 12/1993 | Sharon | |
| 5,362,132 A * | 11/1994 | Griswold | B60N 2/688 297/284.1 |
| 5,558,301 A | 9/1996 | Kerdoncuff et al. | |

(Continued)

FOREIGN PATENT DOCUMENTS

| | | |
|---|---|---|
| EP | 0814020 A2 | 12/1997 |
| EP | 1197429 A2 | 4/2002 |
| EP | 2813430 A1 | 12/2014 |

*Primary Examiner* — Mark R Wendell
(74) *Attorney, Agent, or Firm* — Dickinson Wright PLLC

(57) ABSTRACT

A seat having a seat back pivotally connected to a seat pan, the seat back and the seat pan independently pivotal. At the pivot between the seat back and the seat pan there is a rotary energy attenuation device. The rotary energy attenuating device cooperates with a track system along the length of seat longitudinal members allowing for different directions of travel and height adjustment. The vehicle seat offers passive or active protection from impact and sudden acceleration due to accident or explosive events and is capable of automatically resetting.

16 Claims, 5 Drawing Sheets

(56) References Cited

U.S. PATENT DOCUMENTS

| | | |
|---|---|---|
| 5,699,984 A | 12/1997 | Pinault |
| 5,758,859 A | 6/1998 | Gonzalex |
| 5,788,185 A | 8/1998 | Hooper |
| 5,810,125 A | 9/1998 | Gezari |
| 5,842,669 A | 12/1998 | Ruff |
| 5,984,349 A | 11/1999 | Voorhies |
| 6,047,797 A | 4/2000 | Popjoy |
| 6,074,004 A | 6/2000 | Carmichael |
| 6,206,153 B1 | 3/2001 | Popjoy |
| 6,264,159 B1 | 7/2001 | Su |
| 6,267,440 B1 | 7/2001 | Hoffman |
| 6,312,049 B1 | 11/2001 | Sullivan et al. |
| 6,394,393 B1 | 5/2002 | Mort |
| 6,409,243 B1 | 6/2002 | Hansen |
| 6,450,449 B1 | 9/2002 | Podob et al. |
| 6,672,575 B2 | 1/2004 | Flower et al. |
| 6,820,931 B2 | 11/2004 | Ruff |
| 6,910,558 B2 | 6/2005 | Wang et al. |
| 7,008,015 B2 | 3/2006 | Bischoff |
| 7,100,885 B2 | 9/2006 | Zerner |
| 7,216,931 B2 * | 5/2007 | Friedman ........... B60N 2/42745 |
| | | 297/216.1 |
| 7,328,954 B2 | 2/2008 | Sasaki et al. |
| 7,628,357 B2 | 12/2009 | Mercier et al. |
| 7,654,615 B2 * | 2/2010 | Ventura ................ B60N 2/1615 |
| | | 297/344.15 |
| 7,717,509 B2 * | 5/2010 | Kojima ................ B60N 2/1615 |
| | | 297/216.2 |
| 7,819,469 B2 | 10/2010 | Stevens |
| 7,938,485 B1 | 5/2011 | Perciballi |
| 8,162,372 B2 | 4/2012 | Bettencourt et al. |
| 8,162,374 B2 | 4/2012 | Cantor et al. |
| 8,342,300 B2 | 1/2013 | Guillon |
| 8,371,647 B2 | 2/2013 | Ripley |
| 8,561,748 B1 | 10/2013 | Hahn et al. |
| 8,690,114 B2 | 4/2014 | Boyarski |
| 8,714,642 B2 | 5/2014 | Lamparter et al. |
| 8,939,502 B2 | 1/2015 | Grant et al. |
| 9,132,753 B1 | 9/2015 | Campbell |
| 9,132,754 B2 | 9/2015 | Mindel et al. |
| 9,283,874 B2 | 3/2016 | Mindel et al. |
| 9,382,008 B2 | 7/2016 | Fornecker |
| 9,604,725 B2 * | 3/2017 | Cecinas ................. B60N 2/309 |
| 9,845,028 B2 | 12/2017 | Kim et al. |
| 10,562,420 B2 | 2/2020 | Faruque et al. |
| 10,618,437 B2 | 4/2020 | Fukawatase et al. |
| 11,007,912 B2 * | 5/2021 | Evans ................ B60N 2/42745 |
| 2004/0025985 A1 | 2/2004 | Van Schoor |
| 2005/0127730 A1 | 6/2005 | Bischoff |
| 2006/0011781 A1 | 1/2006 | Knoll et al. |
| 2008/0156602 A1 | 7/2008 | Hiemenz et al. |
| 2008/0296946 A1 | 12/2008 | Reynolds et al. |
| 2009/0045659 A1 | 2/2009 | List et al. |
| 2009/0085265 A1 | 4/2009 | Lucas et al. |
| 2010/0170759 A1 | 7/2010 | Guillon |
| 2010/0270836 A1 | 10/2010 | Mowry et al. |
| 2010/0301647 A1 | 12/2010 | Carter et al. |
| 2012/0153658 A1 * | 6/2012 | Kanda ..................... B60N 2/682 |
| | | 296/65.13 |
| 2012/0263616 A1 | 10/2012 | Rosenboom et al. |
| 2014/0354030 A1 | 12/2014 | Kolb |
| 2020/0298735 A1 | 9/2020 | Evans |

* cited by examiner

ENERGY ATTENUATING VEHICLE SEAT ASSEMBLY

CROSS-REFERENCE TO RELATED APPLICATIONS

This application is divisional of U.S. patent application Ser. No. 16/251,518, filed Jan. 18, 2019, the contents of which are incorporated herein by reference in their entirety.

STATEMENT OF GOVERNMENT INTEREST

This disclosure was made in part with Government support by The United States Department of the Army. The Government has certain rights in the disclosure.

FIELD OF THE DISCLOSURE

This disclosure relates to vehicle seating, and more particularly to energy attenuating vehicle seating to minimize forces on a seat occupant.

BACKGROUND OF THE DISCLOSURE

Energy absorption/dissipation of sudden acceleration/blast events in armored personnel carriers and other armored vehicles has been an ongoing issue. This is especially important with the advent of asymmetric warfare. A simple explosive device buried in a road can incapacitate a vehicle crew and result in loss of battlefield position, materiel and, most irreplaceably, personnel. The issue of pressure wave generation and G force during such an event has been a continuing issue. As solutions are found for yesterday's warfare, the evolving nature of conflict demand, constant refinement and change to ensure crew survivability. There is a continuing need to create an occupant seat that is adapted to minimize the effect of G-force and pressure wave occasioned by IEDs or other battlefield explosives.

SUMMARY OF THE DISCLOSURE

Disclosed is an energy attenuating vehicle seat having a seat back pivotally connected to a seat pan, wherein the seat back and seat and seat pan are independently pivotable. A rotary energy attenuation device extends between longitudinal members of the seat pan and the seat back, and cooperates with a track system along the length of the longitudinal members to dampen forces from impact and sudden acceleration.

Also disclosed is a rotary energy attenuating device having a position adjustment assembly fluidly connected to a static energy setting assembly fluidly connected to an actuator assembly fluidly connected to a weight adjustment system.

Also disclosed is a vehicle using the energy attenuating vehicle seat and/or rotary energy attenuating device.

The energy attenuating vehicle seat has the ability for non-linear travel via a track and the ability to rotate the occupant during an event. This allows for reduction in injury by unloading the spine (zero-G type) and in constrained environments to increase the length and time of energy absorption prior to bottoming out.

Further objects, features and advantages of this invention will become readily apparent to persons skilled in the art after a review of the following description, with reference to the drawings and claims that are appended to and form a part of this specification.

DETAILED DESCRIPTION

Figure 1:
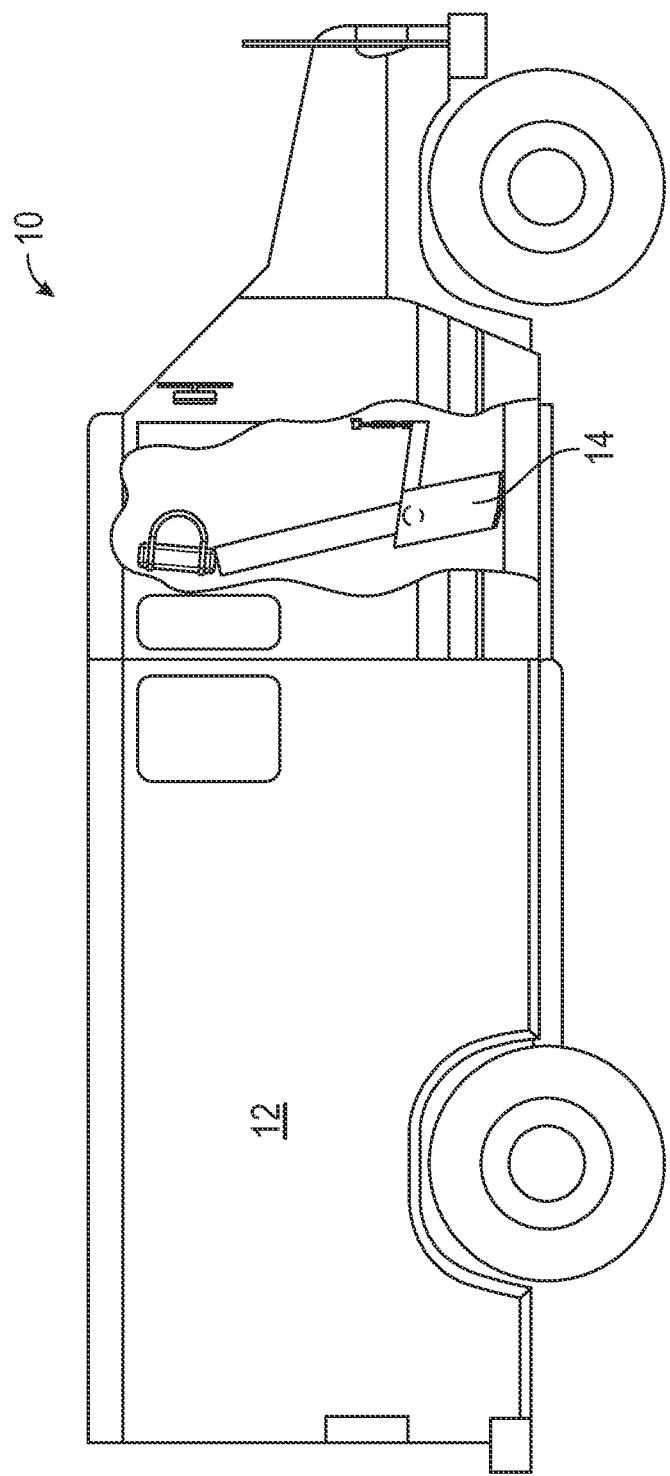
FIG. 1 is a side view of a vehicle equipped with an energy attenuating vehicle seat assembly according to one embodiment of the disclosure.

Turning now to the drawings wherein like numbers refer to like structures, FIG. 1 is a side view of a vehicle 10 with an interior 12 and one embodiment of the energy attenuating seat assembly 14. Such vehicles may have hulls with blast deflection geometries and are generally known in the art. It should be understood that the term "vehicle" should be construed broadly. Moreover, vehicle may be any type of vehicle capable of transporting persons from one location to another. As such, for example, the vehicle 10 could be a wheeled vehicle as shown, but could also be a tracked vehicle, like a tank, an airborne vehicle, such as an airplane or spaceship, an aquatic vehicle, such as a boat or submarine, or rail dependent vehicles, such as a train or amusement park ride. Additionally, it should be understood that while the examples provided in this description show the energy attenuating seat assembly 14 within and interior 12 a vehicle 10, the energy attenuating seat assembly 14 could be used in a variety of different situations, including those situations not involving vehicles. For example, within buildings or vehicle simulations.

Figure 2:
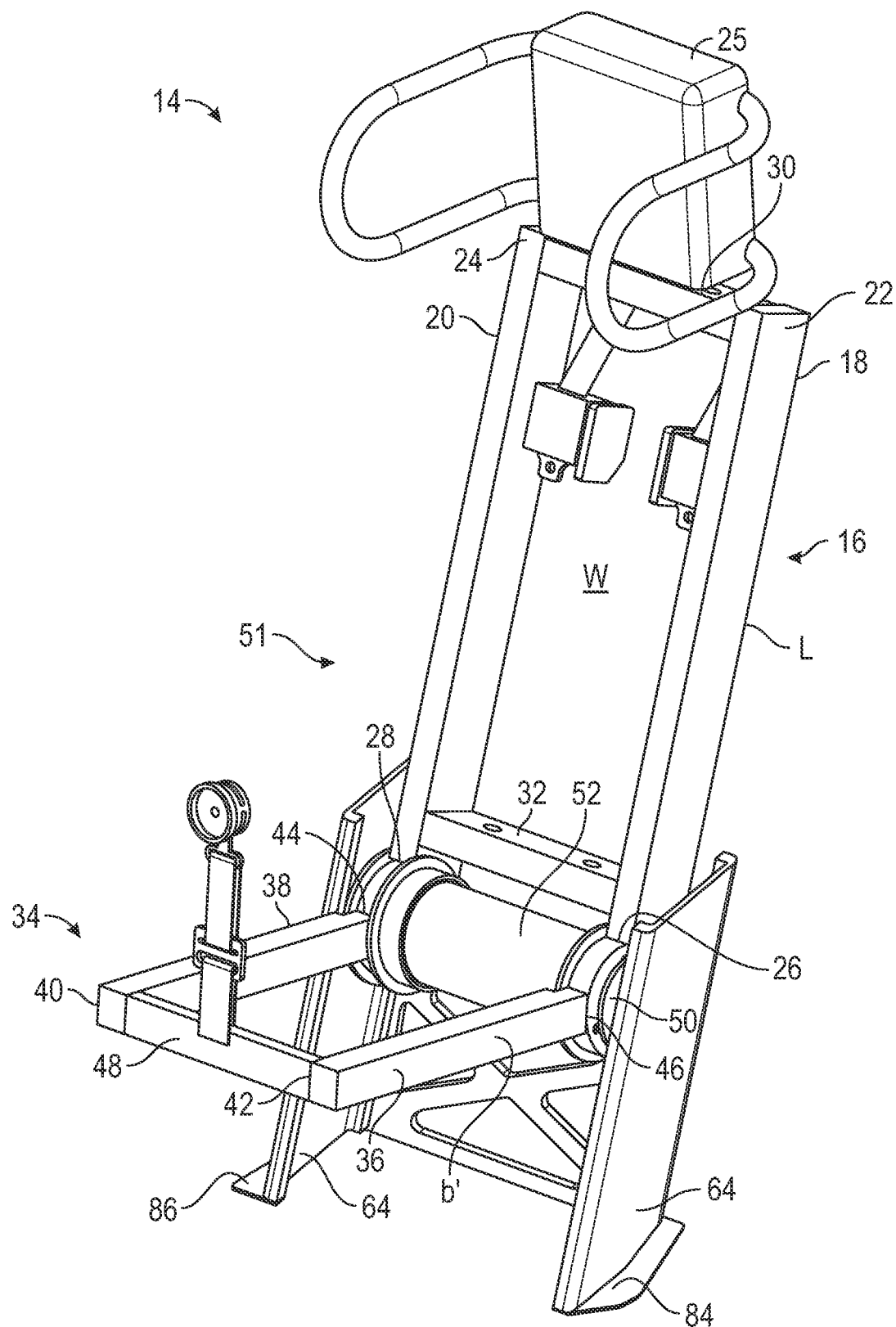
FIG. 2 is a perspective view of one energy attenuating vehicle seat assembly according to one embodiment of the disclosure.
Figure 3:
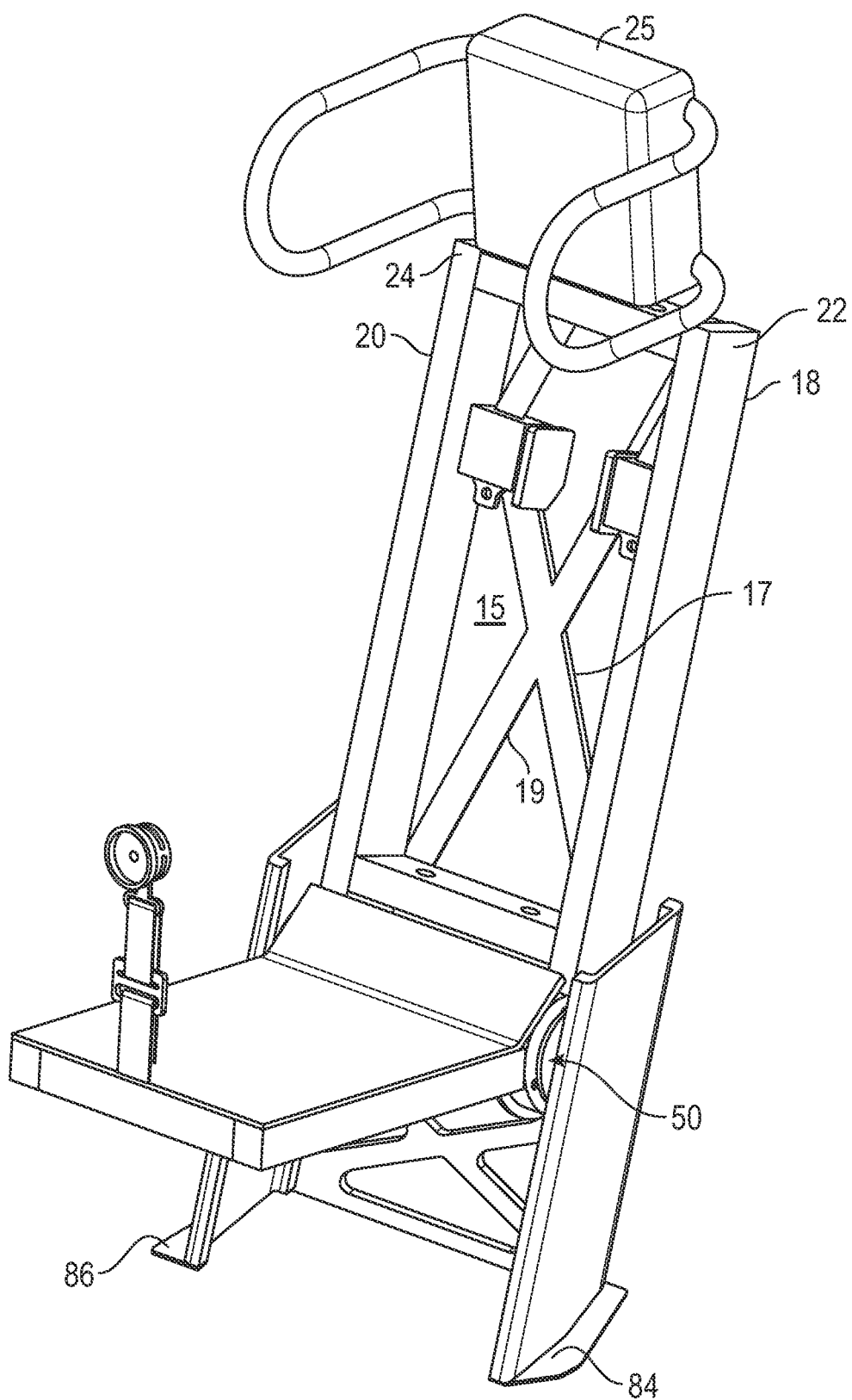
FIG. 3 is a perspective view of the energy attenuating vehicle seat showing a force sensing seat pan.

In FIG. 2 there is shown a perspective view of the energy attenuating seat assembly 14. Seat back 16 is constructed of spaced apart opposed seat back longitudinal members 18 and 20. Longitudinal members 18 and 20 have first ends 22, 24, and second ends 26 and 28, respectively, separated by a length L. First and second transverse members 30 and 32 extend the width W of the seat back to hold the seat back longitudinal members in opposed, spaced apart orientation relative to each other. First transverse member is located substantially proximal to the first ends 22, 24 on the seat back longitudinal members. The first transverse member may be equipped with or support a headrest assembly 25. The second seat back transverse member is located near the second end of the seat back longitudinal member. Optionally, the seat back longitudinal members may have an L channel configuration to present a support surface for a seat back cushion. In the alternative, the seat back assembly may be equipped with cross members 17 and 19 to create a seat back support structure 15, as seen in FIG. 3.

The seat pan 34 is composed of seat pan longitudinal members 36 and 38 in opposed, spaced apart relation to each other. The seat pan longitudinal members have a first end 40, 42, respectively, and second end 44, 46 separated by a length L'. A seat pan transverse member 48 is located adjacent to the seat pan longitudinal member first ends and extend therebetween to hold the seat pan longitudinal members in opposed, spaced apart relation relative to each other.

Both the seat back longitudinal member and the seat pan longitudinal member second ends include a pivot 50. The seat back and seat pan longitudinal members each pivotally connect with a rotary energy attenuating device 52 at their second ends to form a vehicle energy attenuating seat assembly frame 51.

Figures 4A, 4B:
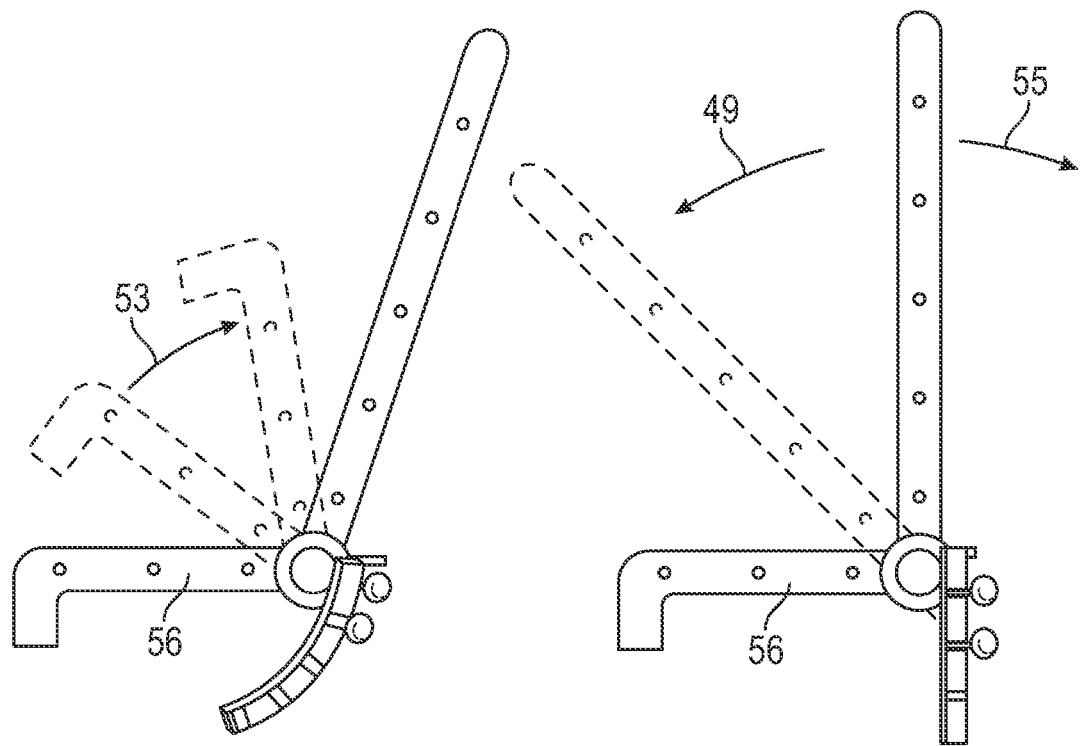
FIG. 4A is a side view of the energy attenuating vehicle seat showing independently pivotal seat back relative to the seat pan.
FIG. 4B is a side view of the energy attenuating vehicle seat showing independently pivoting seat pan relative to the seat back.

As may be seen in FIGS. 4A and 4B, the seat pan and the seat back are independently pivotable relative to each other. For example, the seat pan may be pivoted toward the seat back in direction 53, or the seat back may be pivotal relative to the seat pan in a direction 49 toward the seat pan 34 and in a direction 55 away from the seat pan 34. The ability of the seat pan and/or the seat back to move in a nonlinear direction help significantly in space constrained environments, such as vehicles utilized to transport troops.

Furthermore, as stated previously, the seat pan in the seat back are independently pivotable relative to one another. In one implementation, the seat back may be pivoted in a direction 55 away from the seat pan 34, so as to put the seat back and the seat pan 34 in line with each other. Essentially, by placing the seat back and the seat pan 34 in line with each other, a substantially flat surface is created. This type of configuration allows an occupant to lay substantially flat. As such, when placed in this configuration, the vehicle seat assembly can act as a better stretcher for allowing the occupant to more comfortably rest or for transporting an occupant that has been injured.

Figure 5:
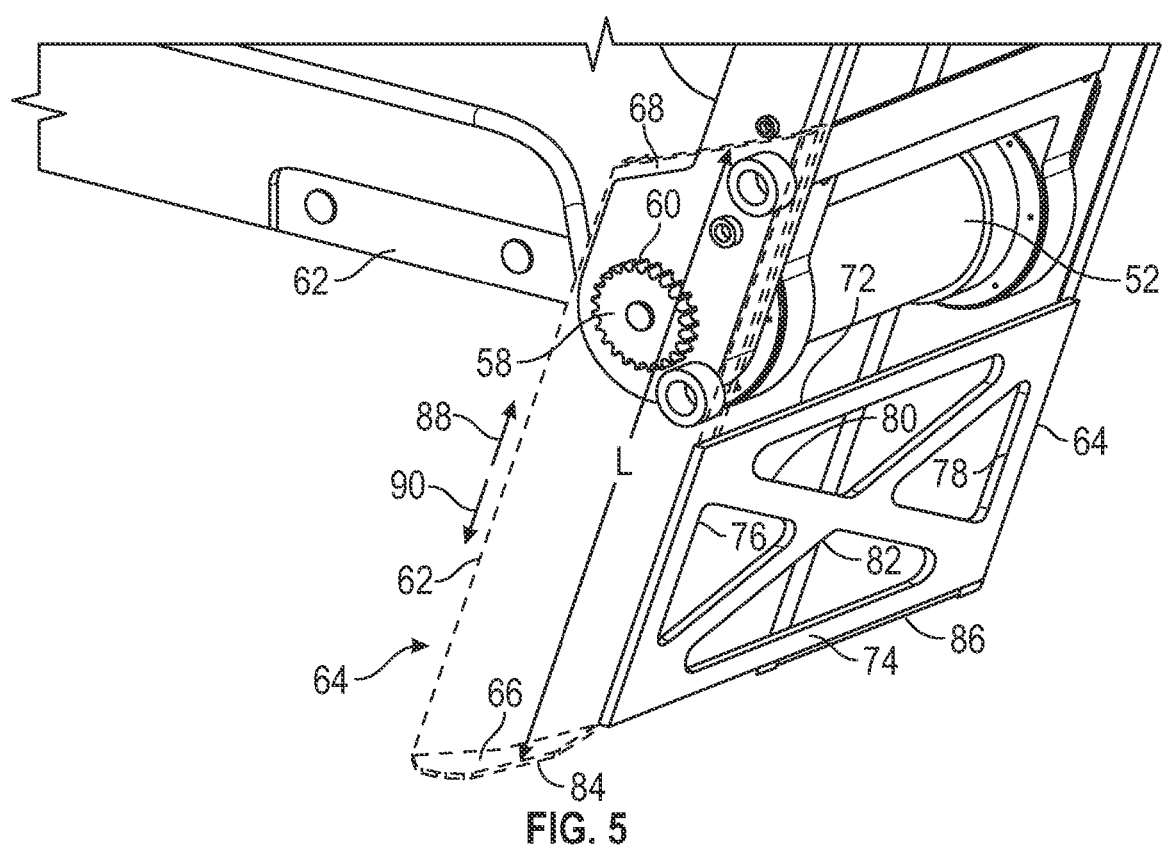
FIG. 5 is a detailed view of the energy attenuating vehicle seat assembly showing a geared rotary energy attenuator in a track in longitudinal rails.

FIG. 5 is a detailed view of a seat showing a geared energy attenuating unit self-contained in a rail system within the vehicle seat architecture. Specifically, the Energy Attenuating Unit 52, as seen in FIGS. 1-4 is located at the pivot of the seat pan and the seat back of the seat assembly. The Energy Attenuating unit (EA) 52 may be equipped with gear 58 located at least at one end of the EA. The gear 58 has teeth 60 that interact with and cooperatively engage with the toothed rack 62 in the spaced apart opposed vehicle seat rail members 64. Each rail member has opposed first and second ends 66, 68, respectively, and a length L extending therebetween. The rail members may be equipped with structural transverse members 72 and 74, longitudinal members 76 and 78, and cross members 80 and 82 to impart rigidity to the rail members and thereby to the seat assembly. Mounting flanges 84 and 86 may be provided to assist mounting the rails to the vehicle.

Figure 6:
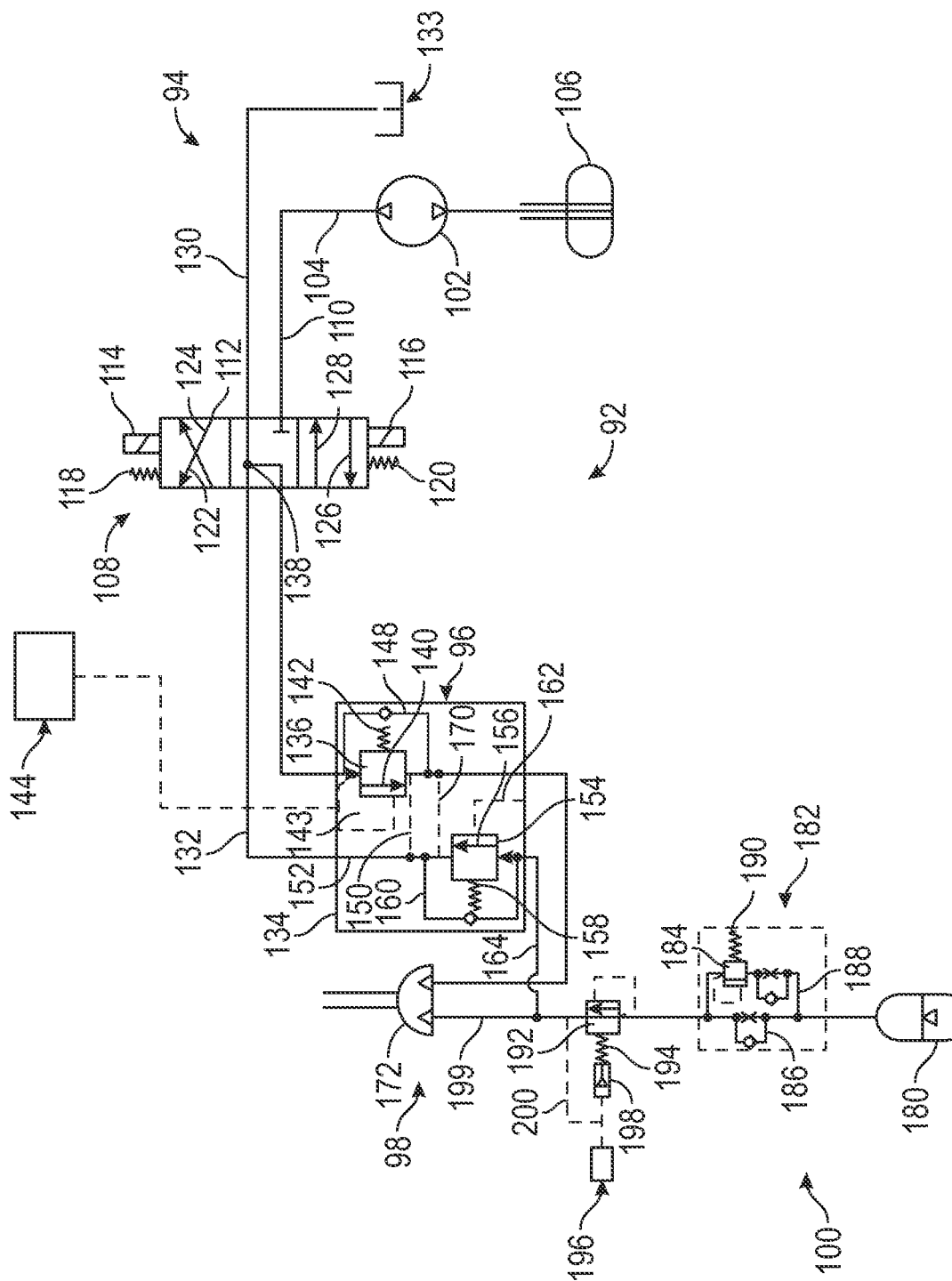
FIG. 6 is a schematic representation of the rotary energy attenuating device showing its internal components and fluid flow circuit.

At least one rail member is equipped with a track system along substantially its length and the rotary energy attenuation device is engaged at its first or second end with the vehicle seat rail member track system. When activated either manually or in a powered mode, the EA engages the track system and moves the seat assembly in an upward direction 88 or a downward direction 90 so that the seat is adjustable to accommodate most persons. By actuating the EA, the energy attenuating vehicle seat back and seat pan responsively move along the vehicle seat rail member length to any desired position and nonlinear motion. The energy attenuating vehicle seat may have the ability for non-linear travel via a track and the ability to rotate the occupant during an event. This allows for reduction in injury by unloading the spine (zero-G type) and in constrained environments to increase the length and time of energy absorption prior to bottoming out FIG. 6 is a schematic of the rotary EA 52, showing fluid circuit 92. The fluid may be any fluid, and is described herein as hydraulic fluid for description purposes only. Furthermore, while a fluid circuit 92 is utilized for the rotary EA 52, it should be understood that other technologies may be utilized. For example, instead of utilizing a hydraulic fluid circuit, the circuit could be a pneumatic circuit. Additionally, instead of utilizing a hydraulic or pneumatic circuit, a mechanical or rotary damper or more motors, such as an electrical motor, could be utilized. As depicted, the rotary EA device circuit has a seat adjustment assembly 94, a static energy setting assembly 96, an actuator assembly 98 and an occupant adjustment system 100. These will be described separately.

Turning to the seat adjustment assembly 94, it can be seen that, in this embodiment, the seat adjustment assembly may be equipped with a bi-directional pump 102 that may direct fluid in a fluid passageway 104 toward or away from a fluid reservoir 106 to a 4-way, 3 position directional valve 108 along a fluid passage 110. The 4-way, 3 position directional valve 108 may be the body 112 of the rotary EA 52. Shafts 114 and 116 carry toothed gears 58 on the rotary EA. The valve 108 is pressure controlled. Coil springs 118 and 120 are preset to exert a certain pressure on the valve. When the coil springs are overcome by the fluid pressure in the valve, the fluid moves in directions 122 and 124, and/or 126 and 128 and the gear 58 on the shafts 114 and 116 are rotated along toothed rack 62. The 4-way, 3 position directional valve is also fluidly connected at 130 to an overflow tank 133.

Turning now to the static energy setting assembly, there is shown a damper assembly 134 that is velocity sensitive and may be either passively or actively controlled. Specifically, first directional velocity sensitive pressure relief valve 136 is fluidly connected to the 4-way, 3 position directional valve 108 at junction 138 along fluid connection 132. The fluid is pumped from the 4-way 3 position directional valve into the first direction velocity sensitive pressure relief valve 136 in direction 140. The valve 136 may be passively controlled by biaser 142 which may be a coil spring. When the coil spring is overcome, fluid moves in a direction 140. If the fluid pressure is not sufficient to actuated valve 136, a fluid bypass circuit 148 is provided to permit fluid to move around valve 136. Another fluid circuit 150 may be provided to fluidly connect valve 136 with a return fluid circuit 152 that connects with the 4-way 3 position directional valve and either recirculate back to the valve 136 or into the overflow tank. The valve 136 may further be actively controlled, as by an electronic circuit 143, which is electronically connected to a control module 144. When activated, the valve 136 opens to receive fluid from valve 108 in a direction 140. The static energy setting assembly is further equipped with a second return direction velocity sensitive pressure relief valve 154 in direction 156 which is opposite to the direction of valve 136. Similar with valve 136, valve 154 may be passively controlled and has a biaser 158 that is shown as a coil spring. When the fluid pressure exceeds the force of the biaser, the valve opens and the fluid is moved along direction 156 to the 4-way 3 position directional valve along fluid passage 152 toward fluid passage 132. If the fluid pressure is not sufficient to actuate valve 154, a fluid bypass circuit 160 is provided to permit fluid to move around valve 154. Another fluid circuit 170 may be provided to fluidly connect valve 154 with a return fluid circuit 152. A bypass circuit valve 154 is also actively controllable, as by an electronic circuit 162, which is electronically connected to a control module 144. When activated, the valve 154 opens to receive fluid from the actuator adjustment system along a fluid connection 164.

The rotary actuator is a directional pump 172 wherein fluid from the valve 136 is directed for circulation within the fluid circuit 100. The pump 172 has a range of output acceptable to the user, and may be in the range of 1.5 inches.

The occupant adjustment system 100 includes an accumulator pump 180 having an output sufficient to move fluid through the entire system, and, in this embodiment, has an output of about 47.5 inches. The accumulator is fluidly connected to an acceleration sensitive return assembly 182, including at least one, one-way valve 184, with bypasses 186 and 188, respectively. The one-way valve 184 may be passive, that is, may include a biaser 190, which may be a spring. When the fluid pressure overcomes the force of the spring, the valve opens. Also, the one-way valve 184 may also be electronically active, and open upon command of the controller. The bypass circuits 186 and 188 may further be equipped with accelerometers that control the valve 184.

When the accelerometer senses the present acceleration, the valve is activated and fluid flows through the valve in the fluid circuit. The occupant adjustment system further includes a one-way pilot/spring valve 192, fluidly connected to the accumulator and one-way valve assembly. The pilot valve may be passive, and equipped with a biaser 194 shown as a coil spring, which, when overcome by the fluid force, opens the valve and allows fluid to flow to the static seat assembly and thence to the 4-way, 3 position directional valve. In addition fluid can flow to a load sensor 196 through valve 198 which may be passive or active, located in the seat pan of the seat assembly. A bypass fluid circuit 200 is also provided to permit fluid to flow to the load sensor in the seat pan.

Describing now the flow of fluid through the system as described, the bidirectional pump 102 directs fluid through fluid connection 110 to the 4-way, 3 position directional valve 108 to lift the seat and otherwise adjust it for an occupant. The flow of fluid through the 4-way, 3 position directional valve permits the EA gear to rotate and engage with the toothed rack in the longitudinal members to set the seat position. Fluid from the 4-way, 3 position directional valve flows through fluid connection 132 into a static energy setting assembly 96. The fluid passes through a one-way pressure sensitive and/or actively controlled valve 136 in the direction of arrow 140 and from there, to the hydraulic rotary actuator 172. The hydraulic rotary actuator forces the fluid to travel at a predetermined flow to an accumulator 180 in the occupant adjustment system 100. The accumulator moves the fluid through fluid connections to an acceleration sensitive return, one-way valve assembly that may be passive or actively controlled. The fluid passes through the one-way valve assembly to a pilot spring valve 194, which itself may be passively or actively controlled. When a biaser to overcome, as if by acceleration due to sudden impact or explosive event, fluid flows through the pilot spring valve to a load sensor in the seat pan response. A certain amount of fluid flows from the pilot spring valve through fluid connection 199 to the hydraulic rotary accumulator for recirculation and some fluid flows through fluid connection 164 to a one-way relief valve 154 in the static seating assembly and thence through fluid connection 130 back to the 4-way, 3 position directional valve. Excess fluid may be directed through the 4-way, 3 position directional valve through fluid connection 130 to the reservoir tank 133.

The occupant adjustment system 100 has the ability to automatically reset during events with the same breakaway load. The return assembly 182 essentially allows the occupant adjustment system 100 to reset so as to be ready for another event. So, after initial event, the occupant adjustment system 100 is able to reset, so as to be ready for a secondary event. The initial event could be an explosion raising the vehicle above the ground, while the secondary event could be the impact of the vehicle crashing into the ground.

The seat as described may be modular as well. For example, the seat architecture or configuration could be expanded to accommodate different coverings, or seat features. For example, the seat back could be equipped with a camel back pocket to offer a more secure fit with an occupant. The seat pan could be equipped with a passive/active load sensor, such as, for example a fluid fillable seat bladder that responds to force by managing the amount of fluid in the bladder to minimize the G force, acceleration, or pressure wave experienced by the occupant in the seat during an explosion event. The headrest assembly 25 may also be modular, as well as a foot rest or side rails on the seat. Thus, the seat is extremely versatile and one frame may be modified to accommodate a number of different design parameters.

While various embodiments and configurations have been discussed, it is understood that the examples provided are not exhaustive. The words used to describe the embodiments are words of description and not words of limitation without departing from the scope and spirit of the invention as set forth in the appended claims.

The invention claimed is:

1. A rotary energy attenuating device for an energy attenuating seat having a seat back and a seat pan mounted to a seat rail member with a track system, comprising,
   a rotary actuator coupled with a gear meshing with the track system, and
   a rotary damper assembly for controlling rotation of the rotary actuator gear in response to an external force acting on the seat causing the position of the seat along the track system to change as the gear rotates along the track system, the rotary damper assembly providing controlled resistance to the change of the position of the seat along the track system in response to the external force.

2. The rotary energy attenuating device in accordance with claim 1 further comprising, the track system extends along a linear path.

3. The rotary energy attenuating device in accordance with claim 1 further comprising, the rotary energy attenuating device is provided for the energy attenuating seat for a vehicle and the track system is oriented to permit a displacement of the seat back and the seat pan along a path defined by the track system having a vertical component in response to an acceleration of the vehicle in the vertical direction caused by the external force.

4. The energy attenuating seat of claim 3, wherein the external force results from a dynamic event in the form of a collision or a blast event of a predetermined threshold magnitude.

5. The rotary energy attenuating device for an energy attenuating seat having a seat back and a seat pan mounted to a seat rail member with a track system comprising,
   a rotary actuator coupled with a gear meshing with the track system,
   a damper assembly for controlling rotation of the rotary actuator in response to an external force acting on the seat causing the position of the seat along the track system to change, further comprising the track system extends along a curved path.

6. The rotary energy attenuating device in accordance with claim 5 further comprising wherein the curved path provides the ability to rotate an occupant of the seat in response to the external force as the position of the seat along the track system changes.

7. A rotary energy attenuating device for an energy attenuating seat having a seat back and a seat pan mounted to a seat rail member with a track system comprising,
a rotary actuator coupled with a gear meshing with the track system, the rotary actuator is located at a pivot of the seat back and the seat pan, and
a damper assembly for controlling rotation of the rotary actuator in response to an external force acting on the seat causing the position of the seat along the track system to change.

8. A rotary energy attenuating device for an energy attenuating seat having a seat back and a seat pan mounted to a seat rail member with a track system comprising,
a rotary actuator coupled with a gear meshing with the track system,
a damper assembly for controlling rotation of the rotary actuator in response to an external force acting on the seat causing the position of the seat along the track system to change, and
a seat adjustment assembly connected to the rotary actuator for providing controlled rotation of the gear in its engagement with the track, enabling the position of the seat along the track system to be adjusted.

9. The rotary energy attenuating device of claim 8, further comprising the seat adjustment assembly includes a hydraulic circuit with a bi-directional pump fluidly connected to a directional valve.

10. The A rotary energy attenuating device for an energy attenuating seat having a seat back and a seat pan mounted to a seat rail member with a track system comprising,
a rotary actuator coupled with a gear meshing with the track system,
a damper assembly for controlling rotation of the rotary actuator in response to an external force acting on the seat causing the position of the seat along the track system to change, the rotary actuator and the damper assembly are each hydraulically operated by a hydraulic fluid.

11. The rotary energy attenuating device in accordance with claim 10, wherein the rotary actuator comprises a directional hydraulic pump.

12. The rotary energy attenuating device of claim 10, further comprising the damper assembly including at least one pressure relief valve, the pressure relief valve modulating the damper assembly based on one or more of a weight of an occupant of the seat, a velocity of the seat, and an acceleration of the seat.

13. A rotary energy attenuating device of for an energy attenuating seat having a seat back and a seat pan mounted to a seat rail member with a track system comprising,
a rotary actuator coupled with a gear meshing with the track system, and
a damper assembly for controlling rotation of the rotary actuator in response to an external force acting on the seat causing the position of the seat along the track system to change, the damper assembly modulated by an occupant weight adjustment system for modulating the operation of the damper assembly as a function of a weight of an occupant of the seat.

14. A rotary energy attenuating device for an energy attenuating seat having a seat back and a seat pan mounted to a seat rail member with a track system comprising,
a rotary actuator coupled with a gear meshing with the track system, and
a damper assembly for controlling rotation of the rotary actuator in response to an external force acting on the seat causing the position of the seat along the track system to change, the damper assembly including a biaser for restricting rotation the rotary actuator in response to the external force until the external force reaches a predetermined level.

15. The rotary energy attenuating device of claim 14 further comprising an adjustment system allowing the seat adjustment assembly to reset to respond to multiple instances of the external forces.

16. A rotary energy attenuating device for an energy attenuating seat having a seat back and a seat pan mounted to a seat rail member with a track system comprising,
a rotary actuator coupled with a gear meshing with the track system,
a damper assembly for controlling rotation of the rotary actuator in response to an external force acting on the seat causing the position of the seat along the track system to change,
the seat back pivotally connected to the seat pan, the seat back and the seat pan independently pivotal relative to each other,
the seat back including spaced apart seat back longitudinal members,
the seat pan including opposed spaced apart seat pan longitudinal members,
the rotary actuator extending between the seat back longitudinal members and the seat pan longitudinal members and pivotably attached to the seat back longitudinal members and the seat pan longitudinal members.

* * * * *